(12) United States Patent
Lu

(10) Patent No.: US 7,330,056 B1
(45) Date of Patent: Feb. 12, 2008

(54) LOW POWER CMOS LVDS DRIVER

(75) Inventor: Timothy Lu, Campbell, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 11/296,187

(22) Filed: Dec. 6, 2005

(51) Int. Cl.
*H03K 3/00* (2006.01)

(52) U.S. Cl. .................... 327/108; 327/109; 327/112; 326/82

(58) Field of Classification Search ............. None
See application file for complete search history.

(56) References Cited

U.S. PATENT DOCUMENTS

| | | | | |
|---|---|---|---|---|
| 6,111,431 | A * | 8/2000 | Estrada | 326/83 |
| 6,356,141 | B1 * | 3/2002 | Yamauchi | 327/543 |
| 6,600,346 | B1 * | 7/2003 | Macaluso | 327/108 |
| 7,012,450 | B1 * | 3/2006 | Oner et al. | 326/86 |
| 7,071,739 | B1 * | 7/2006 | Duzevik et al. | 327/108 |
| 7,129,756 | B2 * | 10/2006 | Omote | 326/115 |

* cited by examiner

*Primary Examiner*—Kenneth B. Wells
*Assistant Examiner*—An T. Luu
(74) *Attorney, Agent, or Firm*—Townsend and Townsend and Crew LLP

(57) ABSTRACT

A low voltage CMOS output driver is adapted to generate an output voltage that stays within predefined limits at relatively low supply voltages. The output driver includes, in part, a voltage-controlled resistor, a voltage-controlled current sink, and a switching stage. A control circuit provides the voltages that are applied to the voltage-controlled resistor and the voltage-controlled current sink. The voltage applied to the voltage-controlled resistor defines the high output voltage. The voltage applied to the voltage-controlled current sink defines the low output voltage. The control circuit is a scaled replica of the output driver and is adapted to consume a current that is 1/L times the current consumed by the output driver.

6 Claims, 2 Drawing Sheets

LOW POWER CMOS LVDS DRIVER

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

FIELD OF THE INVENTION

The present invention relates to integrated circuits, and more particularly to CMOS output drivers.

BACKGROUND OF THE INVENTION

Output drivers are typically used, in part, to ensure that the generated output voltages stay within predefined limits. FIG. 1 is a transistor schematic diagram of a CMOS output driver 10, as known in the prior art. Current flowing through current source 30 is mirrored in transistor 12 using transistor 28, and current flowing through current source 240 is mirrored in transistor 14 using transistor 24.

If input voltage Vin applied to the gate terminals of transistors 20 and 22 is greater than voltage Vip applied to the gate terminals of transistor 18 and 16, node Vop is pulled to a lower voltage relative to node Von. Conversely, if input voltage Vin is smaller than voltage Vip, node Vop is raised to a higher voltage relative to node Von.

In accordance with one known standard, resistive load $R_{load}$ has a resistance of 100 ohms. At $V_{DD}$ supply voltage of 3.3 volts, with single-ended peak voltage of 400 mv across nodes $V_{OP}$ $V_{ON}$, and a common-mode voltage of 1.2 volts, a current of 4 mA is consumed thus resulting in the power consumption of 13.2 mW. As the supply voltage $V_{DD}$ goes down, to e.g. 1.8 volts, transistor 12 starts to enter the linear region of operation thus rendering output driver 100 inoperative. Accordingly, a need continues to exist for a CMOS output driver adapted to operate at relatively low voltages while maintaining the proper voltage across external loads.

BRIEF SUMMARY OF THE INVENTION

In accordance with the present invention, a low voltage CMOS output driver is adapted to generate an output voltage that stays within predefined limits, such as the limits defined by the ANSI/TIA/EIA-644 standard. The output driver includes, in part, a voltage-controlled resistor, a voltage-controlled current sink, and a switching stage disposed between the voltage-controlled resistor and the voltage-controlled current sink and adapted to generate and output voltage across an external load.

In one embodiment, the resistance of the voltage-controlled resistor is controlled by a first operational amplifier and the current through the voltage-controlled current sink is controlled by a second operational amplifier. The switching stage includes a first resistor having a first terminal coupled to a first terminal of the voltage-controlled resistor and a second terminal coupled to a first output node; a first transistor having a first terminal coupled to the first output node, a second terminal coupled to a first terminal of the voltage-controlled current sink, and a third terminal coupled to a first input voltage; a first transistor having a first terminal coupled to a second output node, a second terminal coupled to the first terminal of the voltage-controlled current sink, and a third terminal coupled to a second input voltage; and a second transistor having a first terminal coupled to the first terminal of the voltage-controlled resistor, a second terminal coupled to second output node, and a third terminal coupled to the second input voltage.

In one embodiment, the first and second operational amplifier are disposed in a control circuit that further includes a second voltage-controlled resistor having a resistance that is adapted to vary in response to the output voltage of the first operational amplifier, and a second voltage-controlled current sink configured to sink a current that is adapted to vary in response to the output voltage of the second operational amplifier. The current flowing through the first voltage-controlled current sink is L times the current flowing through the second voltage-controlled current sink, wherein L is a variable greater than or equal to one.

DETAILED DESCRIPTION OF THE INVENTION

In accordance with the present invention, a low voltage CMOS output driver is adapted to generate an output voltage that stays within predefined limits, such as the limits defined by the ANSI/TIA/EIA-644 standard. The output driver includes, in part, a voltage-controlled resistor, a voltage-controlled current sink, and a switching stage. A control circuit provides the voltages that are applied to the voltage-controlled resistor and the voltage-controlled current sink.

Figure 1:
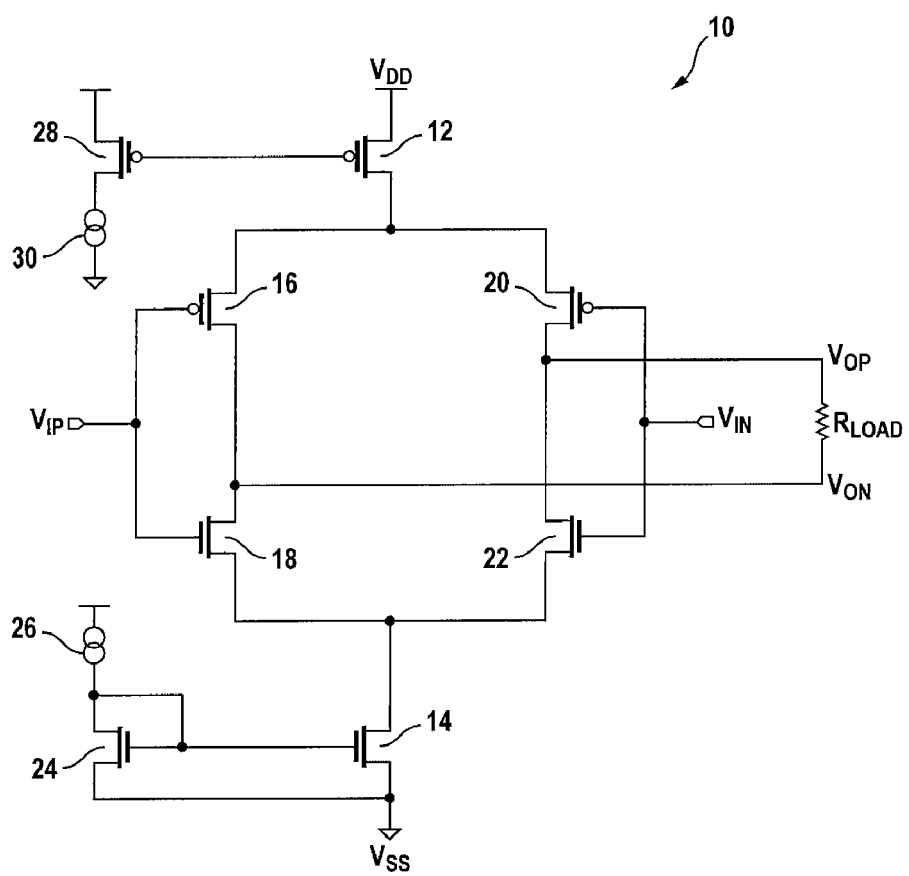
FIG. 1 is a transistor schematic diagram of an output driver, as known in the prior art.
Figure 2:
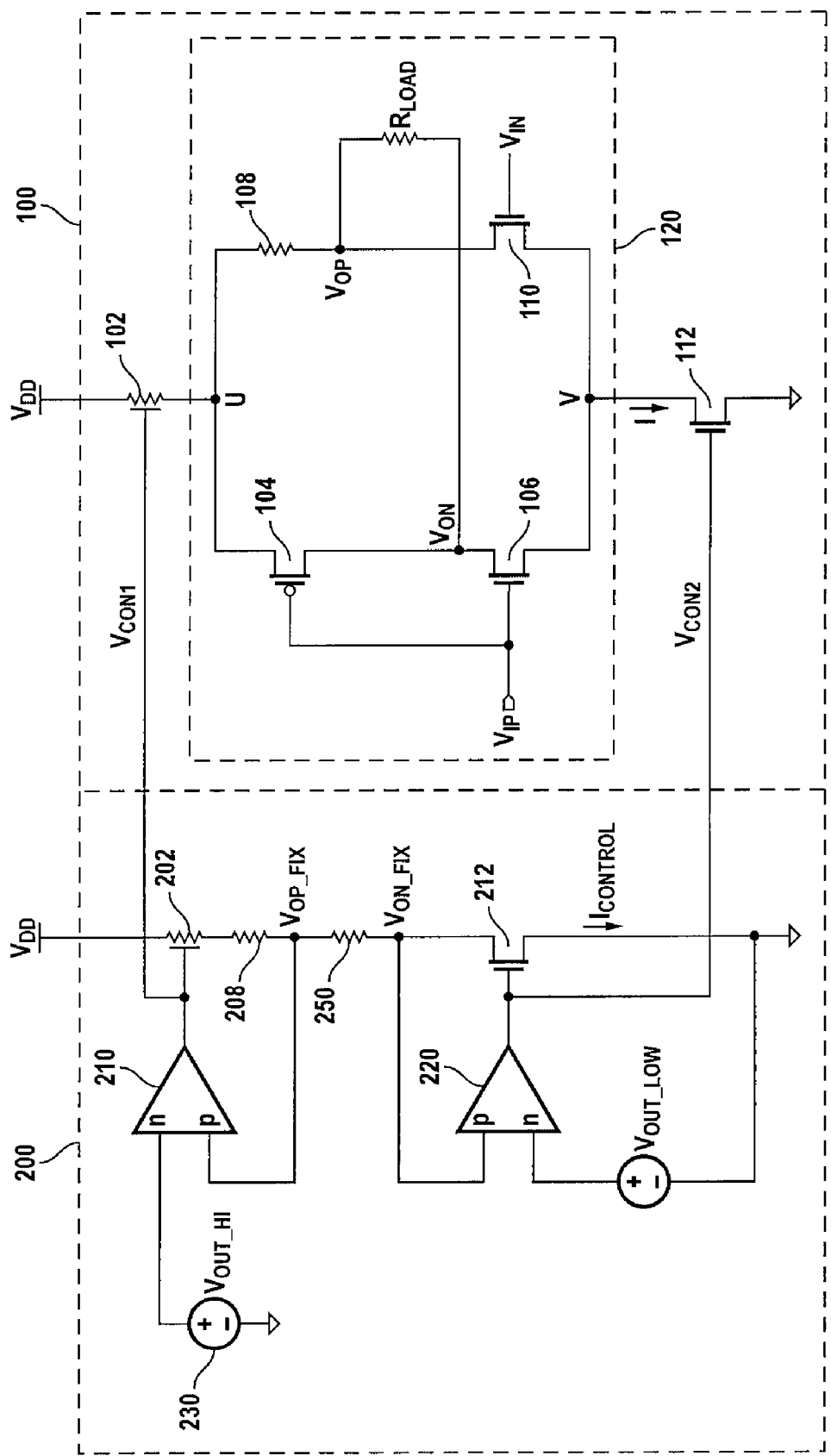
FIG. 2 is a transistor schematic diagram of an output driver coupled to a control stage, in accordance with one embodiment of the present invention.

FIG. 1 is a transistor schematic diagram of a low-voltage CMOS output driver 100, in accordance with one embodiment of the present invention. Output driver 100 is shown as being coupled to control circuit 200. Output driver 100 includes a voltage-controlled resistor 102, a voltage-controlled current sink 112, and a switching stage 120. Switching stage 120, in turn, includes a PMOS transistor 104, a resistor 108, and a pair of NMOS transistors 106, 100. Input voltages Vip and Vin are respectively applied to the gate terminals of transistors 106, 110.

The resistance of voltage-controlled resistor 102 is varied via control voltage Vcon1. The current flowing through current sink 112 is varied via control voltage Vcon2. Current sink 102 includes an NMOS transistor having a gate terminal receiving voltage Vcon2, and drain and source terminals disposed between switching stage 120, and ground terminal Vss.

Switching stage 120 is shown as including PMOS transistor 104, NMOS transistors 106, 110, and resistor 108. External load resistor $R_{load}$ is coupled between nodes Vop and Von. If voltage Vin is smaller than voltage Vip, current I flows through resistor 108, from node Vop to node Von of resistor $R_{load}$, and further through transistor 106 and transistor 112 to the ground terminal. If voltage Vin is greater than voltage Vip, current I flows through PMOS transistor 104, from node Von to node Vop of resistor $R_{load}$, and further through transistor 110 and transistor 112 to the ground terminal. The voltage across resistor $R_{load}$ is equal to the voltage across nodes $V_{OP\_FIX}$ and $V_{ON\_FIX}$, as described further below.

Control circuit 200 includes a voltage-controlled resistor 202, NMOS transistor 212 that is configured as a voltage-controlled current sink, resistors 208 and 250, as well as a pair of operational amplifiers (op amp) 210 and 220. The negative input terminal of op-amp 210 receives voltage $V_{OUT\_HI}$. Accordingly because of the virtual ground between the two terminals of op-amp 210 the voltage at node $V_{OP\_FIX}$ coupled to the positive input terminal of op-amp 210 is substantially the same as $V_{OUT\_HI}$. The negative input terminal of op-amp 220 receives voltage $V_{OUT\_LOW}$. Accordingly because of the virtual ground between the two terminals of op-amp 220, the voltage at node $V_{ON\_FIX}$ coupled to the positive input terminal of op-amp 220 is substantially the same as $V_{OUT\_LOW}$.

Control circuit 200 is adapted to use a current $I_{control}$ that is less than or equal to the current I consumed by output driver 100. Accordingly, each element in control circuit 200 is 1/N times its associated element in output driver 100. For example, transistor 112 is L times the size of transistor 212. Thus, when a current of 4 mA flows through transistor 112, a current of 4/L mA flows through transistor 212. L may vary between 1 and 10 in some embodiments.

In some embodiments, voltage $V_{OUT\_HI}$ is approximately equal to 1.4 volts and voltage $V_{OUT\_LOW}$ is approximately equal to 1.0 volts. Therefore, in such embodiments, nodes $V_{OP\_FIX}$ and $V_{ON\_FIX}$ respectively carry 1.4 and 1.0 volts. Output voltage Vcon1 of op-amp 210 is used to control the resistance of both variable resistor 102 and 202 and thus node U is configured to track the voltage at node $V_{OP\_FIX}$ and thus is also maintained substantially at 1.4 volts. Output voltage Vcon2 of op-amp 220 is used to control the current flow through both current sinks 112 and 212, thus node V is configured to track the voltage $V_{ON\_FIX}$ and thus is maintained substantially at 1.0 volt. Accordingly, in such embodiments, a voltage difference of 0.4 volts is developed across resistor $R_{load}$ between nodes $V_{OP}$ and $V_{ON}$. At $V_{DD}$ supply voltage of 1.8 volts, a difference of 0.4 volts is developed across resistor 102. Because control circuit 200 is a scaled replica of output driver 100, nodes $V_{OP}$ and $V_{ON}$ track the voltage variations at nodes $V_{OP\_FIX}$ and $V_{ON\_FIX}$ as variations due to temperature, process and supply variations occur.

The above embodiments of the present invention are illustrative and not limitative. Various alternatives and equivalents are possible. The invention is not limited by the type of operational amplifier, variable resistor, current sink, etc. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. An output driver comprising:
   a voltage-controlled resistor;
   a voltage-controlled current sink; and
   a switching stage disposed between the voltage-controlled resistor and the voltage-controlled current sink and adapted to generate an output voltage across an external load said output voltage to vary between first and second output voltages, wherein the resistance of said voltage-controlled resistor is controlled by a first operational amplifier and the current through the voltage-controlled current sink is controlled by a second operational amplifier wherein said switching stage further comprises:
   a first resistor having a first terminal coupled to a first terminal directly of the voltage-controlled resistor and a second terminal directly coupled to a first output node;
   a first transistor having a first terminal coupled to the first output node, a second terminal coupled to a first terminal of the voltage-controlled current sink, and a third terminal coupled to a first input voltage;
   a second transistor having a first terminal coupled to a second output node, a second terminal coupled to the first terminal of the voltage-controlled current sink, and a third terminal coupled to a second input voltage; and
   a third transistor having a first terminal coupled to the first terminal of the voltage-controlled resistor, a second terminal coupled to the second output node, and a third terminal coupled to the second input voltage.

2. The output driver of claim 1 wherein said voltage-controlled current sink is a transistor having a gate terminal adapted to receive the output voltage of the second operational amplifier and a source terminal that is coupled to the ground.

3. The output driver of claim 2 wherein the first and second operational amplifier are disposed in a control circuit further comprising:
   a second voltage-controlled resistor having a resistance that is adapted to vary in response to the output voltage of the first operational amplifier; and
   a second voltage-controlled current sink configured to sink a current that is adapted to vary in response to the output voltage of the second operational amplifier.

4. The output driver of claim 3 wherein the current flowing through the first voltage-controlled current sink is L times the current flowing through the second voltage-controlled current sink, wherein L is a variable greater than or equal to one.

5. The output driver of claim 3 wherein the control circuit further comprises:
   a second resistor having a first terminal coupled to the second voltage-controlled resistor, and a second terminal coupled to a positive terminal of the first operational amplifier, wherein the negative terminal of the operational amplifier is coupled to a first voltage supply; and
   a third resistor having a first terminal coupled to the positive terminal of the first operational amplifier and a second terminal coupled to the positive terminal of the second operational amplifier; wherein the negative terminal of the operational amplifier is coupled to a second voltage supply, wherein said first and second voltage supplies define the first and second output voltages.

6. A method of generating an output voltage, the method comprising:
   varying resistance of a resistor in response to a first control voltage to establish a first voltage;
   varying a current flowing through a current sink in response to a second control voltage to establish a second voltage; and
   switching a voltage across an external load from the first voltage to the second voltage in response to a first set of input voltages and switching the voltage across the external load from the second voltage to the first voltage in response to a second set of input voltages, wherein the resistance of the resistor is controlled by a first operational amplifier and the current flow through the current sink is controlled by a second operational amplifier, wherein the first and second operational amplifiers are disposed in a control circuit further comprising:
   a voltage-controlled resistor having a resistance that is adapted to vary in response to the output voltage of the first operational amplifier; and
   a voltage-controlled current sink configured to sink a current that is adapted to vary in response to the output voltage of the second operational amplifier wherein the current flowing through the current sink is L times the current flowing through the voltage-controlled current sink, wherein L is a variable greater than or equal to one.

* * * * *